No. 820,792. PATENTED MAY 15, 1906.
O. G. KELLY.
RACK FOR FRYING FRIED CAKES.
APPLICATION FILED APR. 18, 1905.
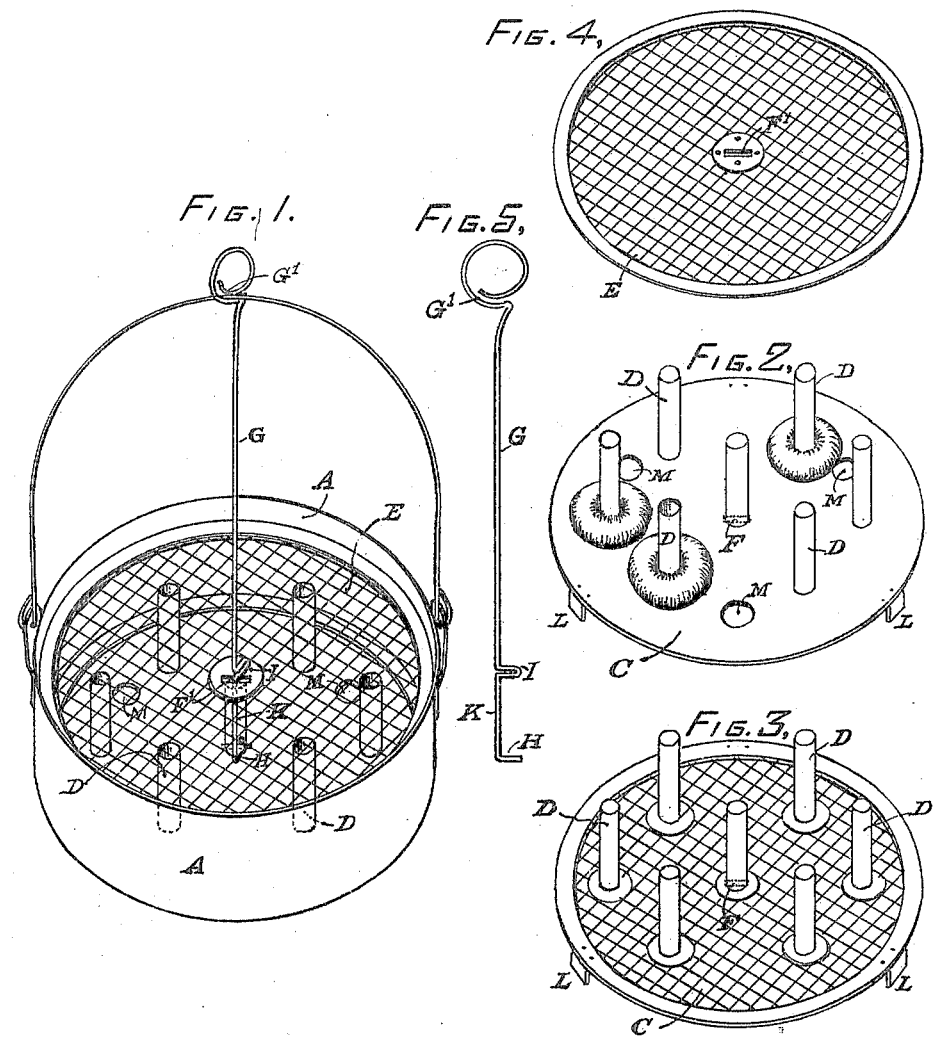
WITNESSES:
Ellen M. Frost,
J. Van Marter
INVENTOR:
Orlando G. Kelly,
by Josiah B. Frost,
his Attorney.

UNITED STATES PATENT OFFICE.

ORLANDO G. KELLY, OF JACKSON, MICHIGAN.

RACK FOR FRYING FRIED CAKES.

No. 820,792.    Specification of Letters Patent.    Patented May 15, 1906.

Application filed April 18, 1905. Serial No. 256,287.

*To all whom it may concern:*

Be it known that I, ORLANDO G. KELLY, a citizen of the United States, residing at No. 124 Taylor street, Jackson, in the county of Jackson and State of Michigan, have invented a new and useful Rack for Frying Fried Cakes, of which the following is a specification.

My invention relates to culinary appliances, and is a device for frying doughnuts. Its objects are convenient and rapid handling and uniform cooking. These objects I accomplish by means of the new and useful device represented in the accompanying drawings, in which the several views are in perspective.

Figure 1 shows the device complete. Fig. 2 is a diaphragm of sheet metal with ventilation-tubes, all together making a rack. Fig. 3 is the same, only constructed of a wire-mesh. Fig. 4 is a cover constructed also of wire-mesh, and Fig. 5 is a handle.

Similar letters refer to similar parts throughout the several views.

A is a pail or kettle in which is the hot lard for frying the doughnuts. The dough, cut in forms for doughnuts, is laid on the rack C and surround the ventilator-tubes D D, &c., as shown in Figs. 1, 2, and 3. When the rack is full, the cover E, constructed of wire gauze or mesh, through which the frying process can be observed, is laid over it and the handle G, Figs. 1 and 5, is introduced, with the hook H down, through the slot F', then through the tube and slot F of the rack C, and given a quarter-turn, so that the rack can be lifted by the hook H, and the hook I will at the same time fasten the cover E down, while the stem K of the handle keeps the cover from sliding off from its place. The whole is then placed in the pail or kettle A, submerged in the hot lard in the pail, and the handle G by its spring handle-ring G' hooked onto the bail of the kettle to prevent the doughnuts rising by gravity to the air and is ready for frying. The rack C is kept a little above the bottom of the kettle or pail A by lugs or legs L L for free circulation of the fat. Two or more racks can be used one above another. This device prevents the holes in the dough closing, and the inside of the dough is kept hot by the constant current of hot fat through them in and around the tubes D D, and so insures thorough cooking of the central part, as well as the outer part, of the cakes, and the dough laid on the diaphragm keeps the doughnuts flat and smooth.

The screen-rack represented in Fig. 3 may be preferable to the plate-rack shown in Fig. 2. The plate-rack C, Fig. 2, for better circulation of the fat is provided with the holes M M.

Having thus fully described the construction, operation, and objects of my device, what I claim, and desire to secure by Letters Patent, is—

1. In a fried-cake-frying device, a rack C provided with ventilating-tubes D D which are open at each end in order to permit the circulation of fat therethrough and slot F in combination with the cover E provided with a slot F' made to rest upon the tubes D D without obstructing the openings of said tubes; the handle G provided with the hooks H I to engage the slots F F', all in combination with and for the purpose of securing said rack and cover from separation; substantially as and for the purposes shown and described.

2. In a fried-cake-frying device the spring handle-ring G' of the handle G made to engage the bail B of the kettle or pail A and in combination therewith and with said rack and cover and arranged to secure the immersion of the rack, cover and contained cakes in the hot fat contained in the kettle or pail; substantially as shown and described.

ORLANDO G. KELLY.

Witnesses:
 LORETTA LANE,
 EFFIE LANE.